United States Patent
Rogers et al.

(10) Patent No.: US 8,411,666 B1
(45) Date of Patent: Apr. 2, 2013

(54) LOCATION-BASED GEOGRAPHICAL ROUTING

(75) Inventors: Frederick C. Rogers, Olathe, KS (US); Jeremy R. Breau, Leawood, KS (US); Khalid M. Medhat, Overland Park, KS (US); Terry D. Nebergall, Gardner, KS (US); Joseph C. Shojayi, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 662 days.

(21) Appl. No.: 12/617,925

(22) Filed: Nov. 13, 2009

(51) Int. Cl.
*H04L 12/28* (2006.01)
*H04L 12/56* (2006.01)

(52) U.S. Cl. .................. 370/351; 370/392; 370/395.31; 709/238

(58) Field of Classification Search .................. 370/252, 370/241, 253, 230, 331, 332, 254, 338, 351, 370/360, 389, 392, 395.3, 395.31, 400, 401, 370/422; 455/414, 436–439, 442; 709/220–228, 709/238–243, 245, 249
See application file for complete search history.

(56) References Cited

U.S. PATENT DOCUMENTS

| | | | |
|---|---|---|---|
| 7,352,731 B1* | 4/2008 | Leung | 370/338 |
| 2003/0023747 A1* | 1/2003 | Fouquet et al. | 709/238 |
| 2004/0202160 A1* | 10/2004 | Westphal | 370/389 |
| 2005/0018645 A1* | 1/2005 | Mustonen et al. | 370/349 |
| 2007/0180495 A1* | 8/2007 | Hardjono et al. | 726/3 |
| 2010/0128638 A1* | 5/2010 | Navas et al. | 370/254 |
| 2011/0274091 A1* | 11/2011 | Nikander et al. | 370/331 |

OTHER PUBLICATIONS

Oliveria et al, "Geographicallly Informed Inter-Domain Routing", IEEE, 2007, pp. 103-112.*

* cited by examiner

*Primary Examiner* — Habte Mered (57) ABSTRACT

Methods are disclosed for routing data, such as a packet, from a source router to a destination router based on geographical information associated with a destination mobile device. A table is accessed to determine whether there is a destination router located in the list of routers that is located within the same geographical area as the destination mobile device. If there is a destination router that meets this criteria, the data is sent to the destination router. But if there is not a destination router that meets this criteria, the data is routed based on network topology.

19 Claims, 6 Drawing Sheets

LOCATION-BASED GEOGRAPHICAL ROUTING

SUMMARY

Embodiments of the invention are defined by the claims below, not this summary. A high-level overview of various aspects of the invention are provided here for that reason, to provide an overview of the disclosure and to introduce a selection of concepts that are further described below in the detailed-description section. This summary is not intended to identify key features or essential features of the claimed subject matter, nor is it intended to be used as an aid in isolation to determine the scope of the claimed subject matter.

In brief and at a high level, this disclosure describes, among other things, methods for routing data packets from one router to another router based on geographical information corresponding to a destination mobile device, or a mobile device to which the data packet is to be sent so that a communications session can be established between two mobile devices. It may be determined whether the geographical information associated with the destination mobile device matches any of the routers in a table that lists routers that have an established relationship with the router that is sending the data packet. They may match if a router in the table is within the same geographical area as the destination mobile device based on its geographical information, such as its geographical coordinates. If a destination router is found, the data packet is routed to the destination router so that it can be forwarded to the destination mobile device, thus establishing a communications session.

BRIEF DESCRIPTION OF THE SEVERAL VIEWS OF THE DRAWINGS

Illustrative embodiments of the present invention are described in detail below with reference to the attached drawing figures, wherein.

DETAILED DESCRIPTION

The subject matter of the present invention is described with specificity herein to meet statutory requirements. However, the description itself is not intended to define the invention, which is what the claims do. Rather, the claimed subject matter might be embodied in other ways to include different steps or combinations of steps similar to the ones described in this document, in conjunction with other present or future technologies. Moreover, although the term "step" or other generic term might be used herein to connote different components or methods employed, the terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| AAA | Authentication, Authorization, and Accounting |
| BSID | Base-Station Identifier |
| BTS | Base Transceiver Station/Base Station |
| CDMA | Code Division Multiple Access |
| CoA | Care-of Address |
| FA | Foreign Agent |
| GGSN | GPRS Gateway Support Node |
| GPRS | General Packet Radio Service |
| GRE | Generic Routing Encapsulation |
| GSM | Global System for Mobile communications (Groupe Spécial Mobile) |
| HA | Home Agent |
| IP | Internet Protocol |
| IPv6 | Internet Protocol Version 6 |
| L2TP | Layer two Tunneling Protocol |
| LED | Light Emitting Diode |
| MIP | Mobile IP |
| NAI | Network Address Identifier |
| NEID | Network Element Identifier |
| PDA | Personal Data Assistant |
| PDSN | Packet Data Serving Node |
| TDMA | Time Division Multiple Access |
| UMTS | Universal Mobile Telecommunications System |

Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
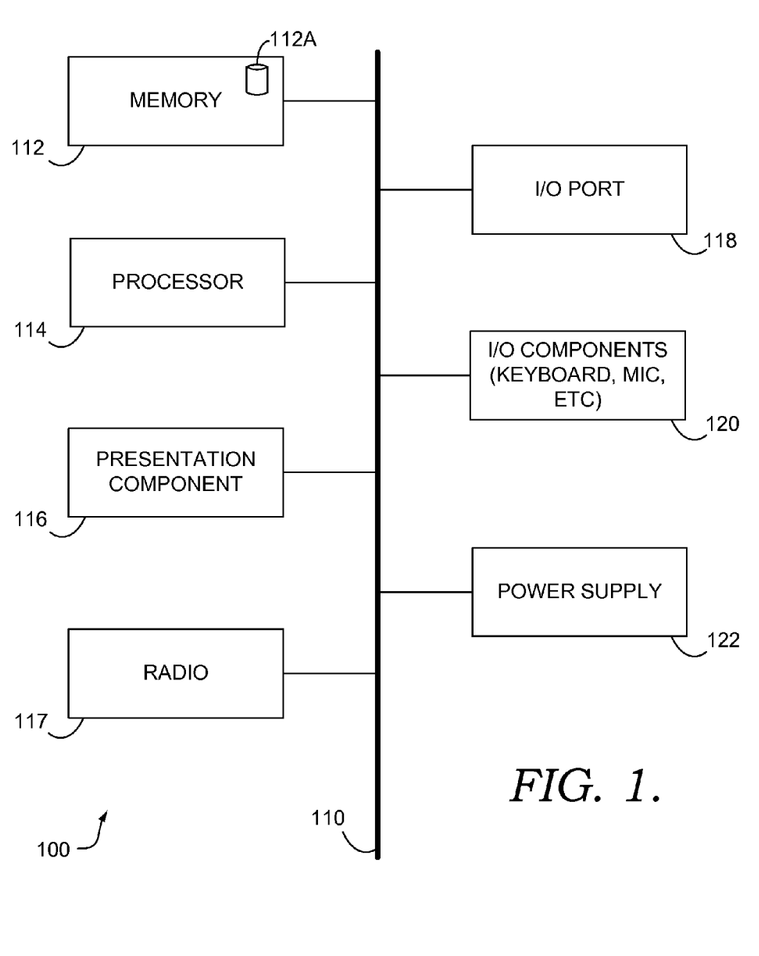
FIG. 1 depicts an illustrative device suitable for use in connection with an embodiment of the present invention.

Turning now to FIG. 1, a block diagram of an illustrative mobile computing device ("mobile device") is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

We previously have described various memory components that memory 112 might take the form of. Thus, we will not elaborate more here, only to say that memory component 112 can include any type of medium that is capable of storing information (e.g., a datastore 112A). Processor 114 might actually be multiple processors that receive instructions and process them accordingly. Presentation component 116 includes the likes of a display, a speaker, as well as other components that can present information (such as a lamp (LED), or even lighted keyboards).

Radio 117 is a radio that facilitates communication with a wireless telecommunications network. Illustrative wireless telecommunications technologies include CDMA, GPRS, TDMA, GSM, and the like. In some embodiments, radio 117 might also facilitate other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 110. Power supply 122 includes items such as batteries, fuel cells, or any other component that can act as a power source to power mobile device 100.

Figure 2:
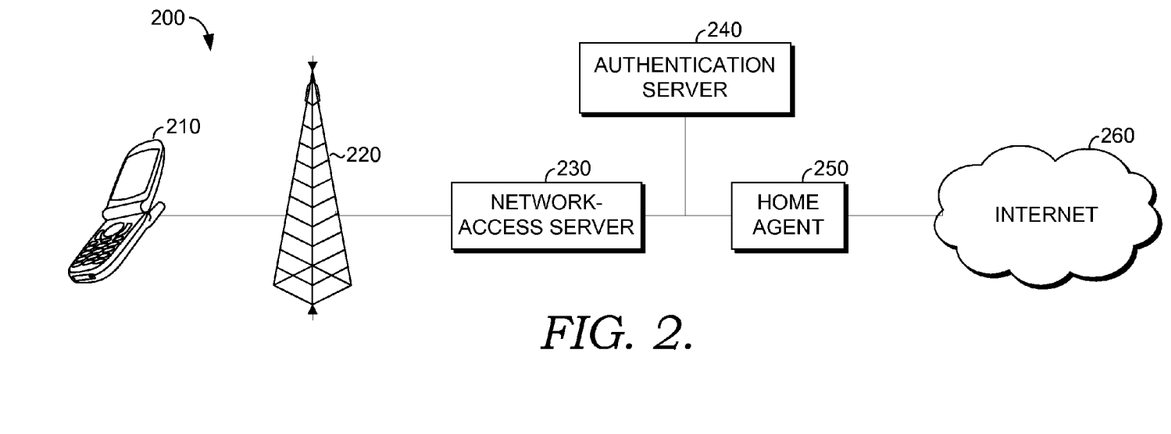
FIG. 2 depicts an illustrative operating environment suitable for practicing an embodiment of the present invention.

Turning now to FIG. 2, an illustrative operating environment is provided and referenced generally by the numeral 200, which depicts an illustrative wireless-telecommunications networking environment that enables a mobile device 210 to communicate through what is referred to as a core network 220 to reach other end devices or various applications, for example, by way of the Internet 260.

Mobile device 210 is the type of device described in connection with FIG. 1 in one embodiment and may include a client application that helps carry out aspects of the technology described herein. Whenever we speak of an application, software, or the like, we are really referring to one or more computer-readable media that is embodied with a set of computer-executable instructions that facilitate various actions to be performed. We will not always include this lengthy terminology because doing so would make this document more difficult to read.

Mobile device 210 communicates with a base transceiver station (BTS) 220 by way of a communications link. BTS 220 provides access to a core network. Various forms of a core network exist. A selection of components that make up a core network are illustrated in FIG. 2. It is contemplated, however, that more or less components, or even different components than are shown in FIG. 2 may make up the core network. Again, the components shown in FIG. 2 are shown as but one example of an operating environment that can be used to carry out an embodiment of the present invention.

One of the components that helps facilitate communication between mobile device 210 and other networks (not shown) as well as the Internet 260 is a network-access server 230. Network-access server 230, which may be a packet data serving node (PDSN) in one embodiment, assists in communications between the device 210 and other components, such as an authentication server 240. The network-access server 230, in one embodiment, sends a care of address (CoA) and a simple IP address to the device using information accessed from the authentication server 240. Any device that provides similar functionality is contemplated within the scope of this disclosure. For example, a GSM offers similar functionality in networks that utilize GSM or UMTS technology. In one embodiment, the network-access server 230 can act as a client for authentication server 240, which helps insure that mobile device 210 is authorized to communicate via the wireless telecommunications network. In some embodiments, authentication server 240 is known as an application, authorization, and accounting (AAA) server. But it can be any device that helps authenticate mobile device 210. In one embodiment, network-access server 230 includes a set of computer executable instructions that help carry out various aspects of the technology described herein.

The home agent 250 is a router on the mobile device's 210 home network that maintains information about the device's current location, which, in one embodiment, is identified in a care-of-address. This allows the mobile device to keep the same IP address even when it connects from a different location. In one instance, the home agent 250 works in conjunction with a foreign agent (not shown), which is a router on the visited network.

As mentioned, some components are not depicted on FIG. 2 so as to not obscure aspects of the various embodiments of the present invention. For example, a radio network controller often sits between BTS 220 and network-access server 230, although its functionality can be subsumed into other elements. We have included a selection of components so as to not obscure more relevant aspects of the technology that we are describing.

Figure 3:
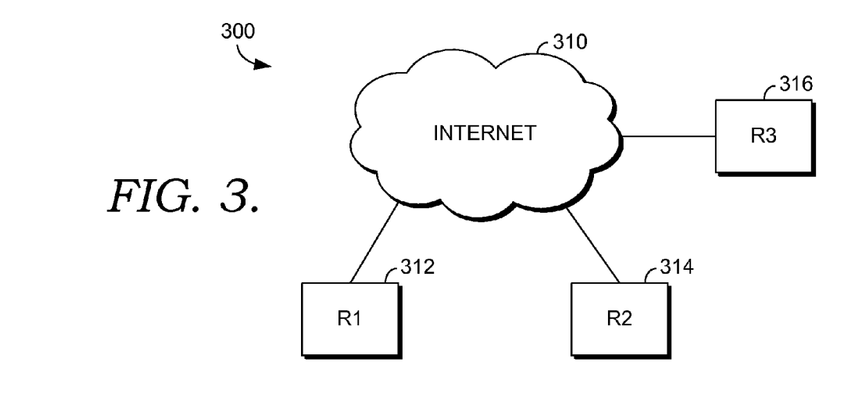
FIG. 3 depicts an illustrative operating environment suitable for practicing an embodiment of the present invention.

Turning now to FIG. 3, an illustrative operating environment 300 suitable for practicing an embodiment of the present invention is depicted. As used herein, a router is a device or, in some cases, software in a computer that determines the next network point to which data should be forwarded toward its destination. In one instance, data is a packet having a header and a payload. Routers may be used in packet-switched networks, such as the Internet. Routers are typically connected to at least two networks, wherein a router decides which way to send each information packet based on its current understanding of the state of the networks it is connected to. In one instance, a router may create or maintain a table of the available routes and their conditions and use this information along with distance and cost algorithms to determine the best route for a given packet. Typically, a packet may travel through a number of network points with routers before arriving at its destination. Utilizing an embodiment of the present invention, however, routers are provided with intelligence to determine where (e.g., which router) to send a packet, such as an Internet Protocol version 6 (IPv6) packet, based on a geographical location of the destination device, to which the packet or data is sent.

For instance, FIG. 3 illustrates three routers, R1 312, R2 314, and R3 316 connected to each other by way of an Internet 310. These routers may belong to the same service provider or network, or may belong to different service providers or networks. While three routers are illustrated, more or less routers may be involved in routing a packet to a destination mobile device. Three are shown in FIG. 3 for exemplary purposes only In one exemplary embodiment, R1 312 and R2 314 belong to different service providers. Assume they belong to service provider A servicing mobile device A, and service provider B servicing mobile device B, respectively. Now assume that mobile device A is attempting to call or establish a wireless communications session with mobile device B. Both mobile devices have associated geographical coordinates that represent a particular area in New York City. R1 312 may receive a packet from mobile device A, which includes an IP address associated with mobile device A. In this example, mobile device A is the source mobile device and mobile device B is the destination mobile device. Generally, as used herein, a source mobile device is a mobile device that initiates a communications session by sending a packet or other data to a router to which it is connected or with which it is associated. A destination mobile device is the mobile device that is to receive the packet or data such that a communications session can be initiated with the source mobile device.

Referring back to the example above, the packet may include information associated with mobile device B, such as its IP address. The IP address may include, in one embodiment, location information that indicates mobile device B's physical location. In one instance, location information is geographical coordinates that may come from one of many sources including, but not limited to, a global positioning system (GPS) on the mobile device, or from a radio access network (RAN) that uses triangulation technology to determine a location of the mobile device. Once the packet is received, R1 312 may determine that mobile device A and mobile device B are located in the same city. Rather than sending the packet through multiple routers across the country to finally reach a router in the same city as where the packet was initiated, R1 312 may determine that R2 314 is also in New York City, such that the packet can be sent directly to R2 314, and finally to mobile device B. This type of geographical routing allows for both broadcast and peer-to-peer distribution of information. For instance, a service may be broadcast to mobile devices located in a certain geographical area. In the alternative, a certain geographical area may be blocked from receiving a message or other information. Peer-to-peer may include, such as in the example given above, one user in a network wishing to communicate with another user in either the same or a different network.

In the embodiment described above, the IP address associated with mobile device A may have two portions, including a user portion and a network portion. In one instance, geographical coordinates may be inserted into the user portion of the IP address. Location information, such as geographical coordinates, may come from a global positioning system (GPS) within the mobile device. For example, the GPS may send geographical coordinates of the mobile device to either a network-access server or the home agent, depending on whether a simple IP address or a mobile IP address is desired. In another instance, the location information may be determined by a radio access network (RAN) based on triangulation technology. The RAN, for example, may insert geographical coordinates into a registration request that is forwarded to a component that embeds an IP header with the geographical information. Other methods of determining geographical information of a mobile device are also contemplated to be within the scope of the present invention. Geographical coordinates, in one embodiment, are latitude and longitude coordinates, including hours, minutes, seconds, and degrees.

While routers today typically look at the network portion of an IP address first when routing packets, using embodiments of the present invention, routers may now analyze the user portion first to determine location information for the source and destination mobile devices, and then, in one embodiment, analyze the network portion. Returning to the example above, mobile device B may have a GPS, which allows a precise location of the mobile device to be determined, and subsequently allows this location information to be inserted into the mobile device's IP address, such as the header of the IP address. R1 may determine that it has a relationship with R2 and that R2 is in a geographical area associated with mobile device B, and thus may route the packet to R2. Determining whether R1 has a relationship with R2 may involve R1 performing a lookup in a table to see if another router is listed in the table that is located within a geographical area associated with the location information of mobile device B. R2 may determine if mobile device B is locally attached to it. If R2 is not locally attached or connected, R2 may perform the same analysis as described above and determine another router to which to send the packet. In some instances, such as if R2 does not have a relationship with R1 and R1 is unable to find another router to send the packet to based on the destination's location information, R1 may route the packet based on layer three routing, or based on the network topology, which is how routing is typically performed.

Figure 4:
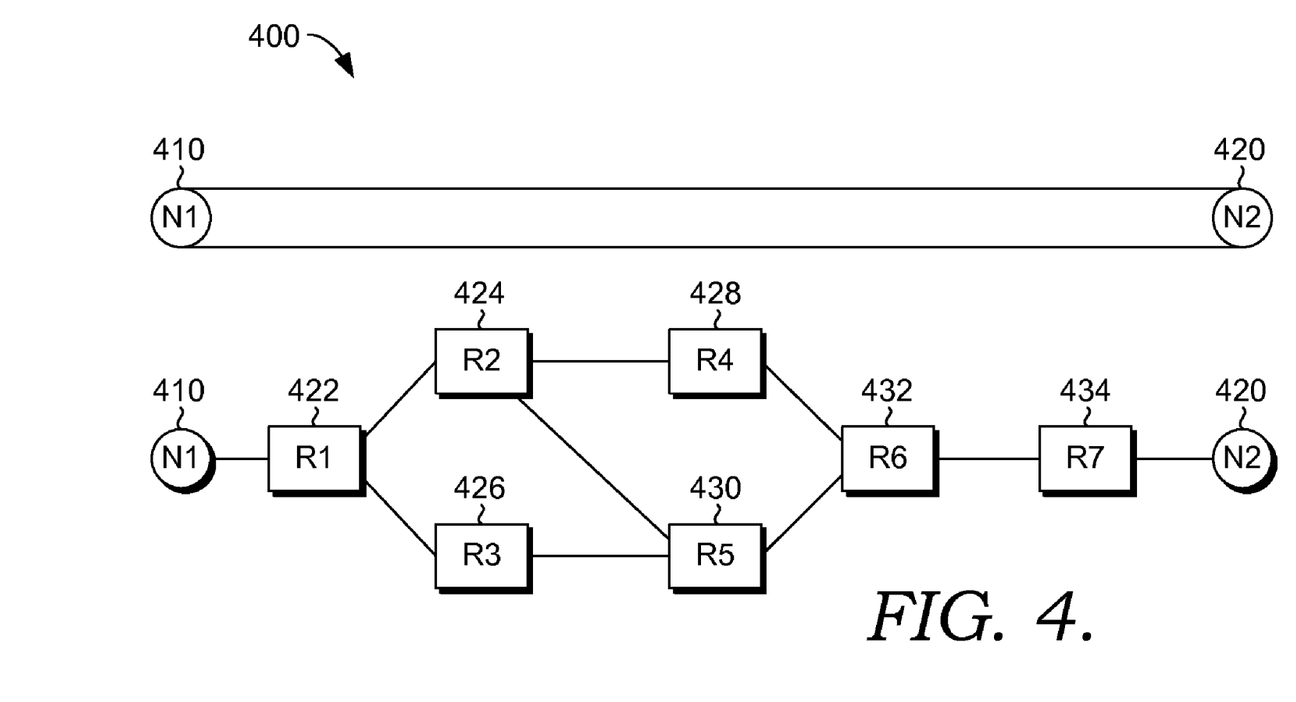
FIG. 4 depicts an illustrative operating environment suitable for practicing an embodiment of the present invention.

FIG. 4 depicts an illustrative routing diagram 400 suitable for practicing an embodiment of the present invention. Initially, FIG. 4 shows a mobile node N1 410 and a mobile node N2 420, depicted in both the top and lower portion of FIG. 4. The lower portion of FIG. 4 represents an exemplary network topology containing multiple routers, and specifically routers R1 422, R2 424, R3 426, R4 428, R5 430, R6 432, and R7 434. These routers may belong to the same service provider's network, or may belong to multiple networks. Typically, when N1 410 wants to communicate with N2 420, it would first send a packet to the router to which it is directly or locally connected. R1 422 may then make a determination as to which router to send the packet to next. In one instance, this determination may be based on efficiency and cost considerations, such as the fastest route to get to the destination.

While the method described routes packets based on network information associated with an IP address, an embodiment of the present invention allows for packets to be routed based on location information, such as geographical coordinates, associated with the source and destination mobile devices. To accomplish this, a tunneling protocol may be used to build a tunnel across a large network(s) to create a different logical topology for a network. For instance, one service provider's network may be composed of hundreds of routers, but a network can be built on top of that underlying network using a tunneling protocol. Generally, tunneling protocols are used by computer networks when one network protocol (e.g., the delivery protocol) encapsulates a different payload protocol. Here, a tunneling protocol is used to generate routing peers based upon geography, which provides for efficiently routing packets from one router to another based on the geographical coordinates of the mobile devices. Tunneling protocols may include, but are certainly not limited to Layer two Tunneling Protocol (L2TP) and Generic Routing Encapsulation (GRE).

Referring back to FIG. 4, the top portion of the figure illustrates how a tunneling protocol would work. Many routers may be bypassed and a packet may be sent directly from one router to the next when routing is based on geography. For instance, assume that N1 410 wishes to communicate with N2 420. Using a tunneling protocol, a router (not shown) may receive a packet from N1 410 and may determine a second router (not shown) to which to send the packet. This determination, in one embodiment, includes analyzing the user portion of the IP address, which contains geographical coordinates of the destination. The router may then perform a lookup in a table to determine if it has an existing relationship with a router locating with a geographical area of the destination. If so, the packet may be routed to the identified router. This may bypass sending the packet through the network provider's backbone using network topology and, instead, send the packet to far fewer routers to reach its destination.

Figure 5:
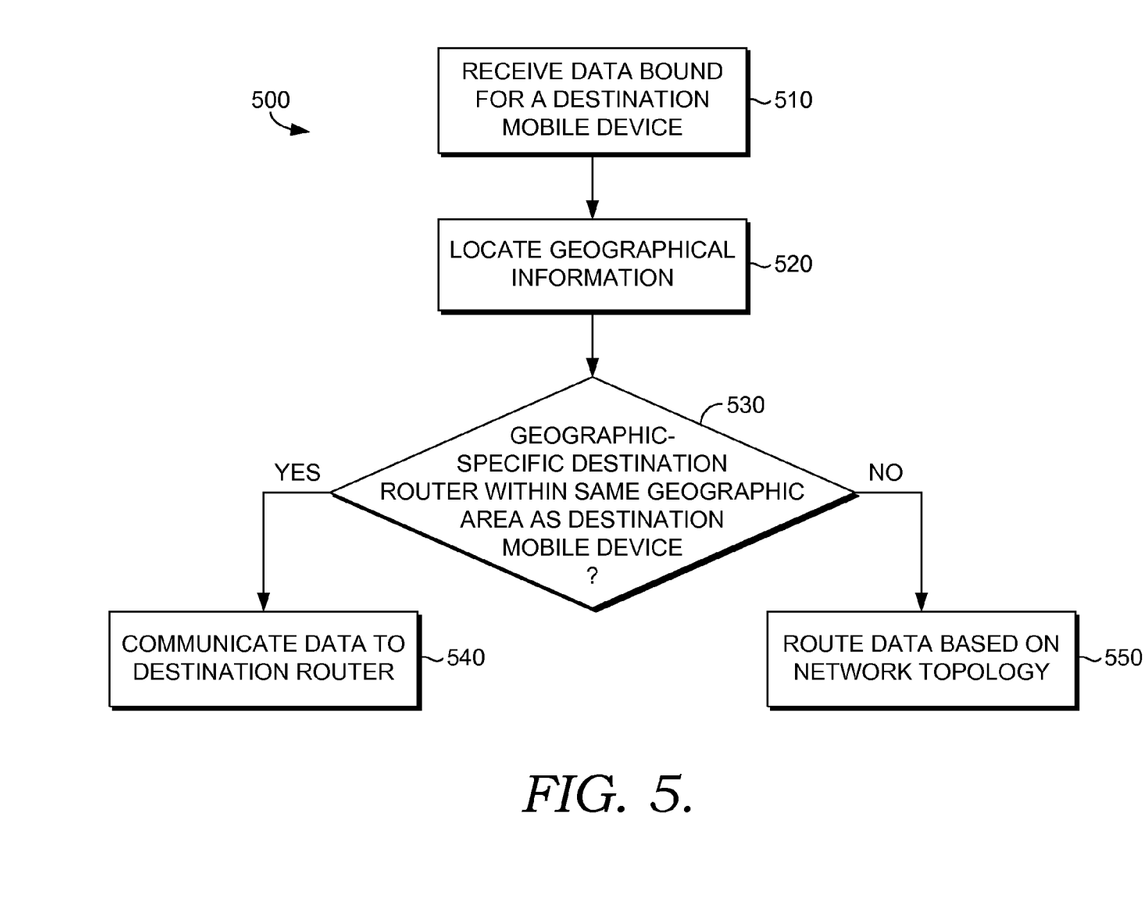
FIGS. 5-7 depict illustrative methods for routing information through a wireless telecommunications network based on location information associated with a mobile device.

FIG. 5 illustrates a method 500 for routing information through a wireless telecommunications network based on location information associated with a mobile device. Initially, at step 510, data is received that is bound for a destination device. The data, in one instance, is received from a source mobile device and is to be communicated to a destination mobile device by way of a source router and a destination router. As mentioned above, a source mobile device is a mobile device that initiates a communications session with another device, such as a destination mobile device. The source mobile device sends data, such as a packet, to a router with which it is associated. The router then determines where to send the data so that it eventually reaches the destination mobile device. A source router is any router that sends data through the network, and a destination router is any router that receives the data and forwards it to either another router or the destination mobile device. In one instance, the source router is connected to or is associated with the source mobile device, and the destination router is connected to or associated with the destination mobile device.

At step 520, geographical information is located. For instance, it may be determined that the data includes geographical information associated with the destination mobile device. As previously mentioned, geographical information may be determined by one of many methods, including a GPS in the mobile device, by a RAN that uses triangulation technology to determine the geographical location, etc. Other methods of determining location are contemplated to be within the scope of the present invention. The data, as discussed, may be an IP packet in one embodiment that includes a header and a payload. The header, for instance, may include the IP address associated with the source and destination mobile devices (e.g., source IP address and destination IP address). The IP address associated with the destination mobile device may include geographical information of the destination mobile device determined by one of the methods described above.

At step 530, it is determined whether a geographic-specific destination router is within the same geographic area as the destination mobile device. In one embodiment, a table containing a list of routers is accessed to determine, based on the geographical information, whether the list includes a destination router that is located within the same geographical area as the destination mobile device. The same geographical area, in one embodiment, is a predefined area determined when the relationship was established between the source router and the destination router. It may be the same city, zip code, state, county, or other region.

In addition to the list of routers are network numbers associated with each router. In one embodiment, each router in the list has an established relationship with the router that is performing the lookup in the table, which here is the source router. A relationship may be established between routers within the same network and between routers in networks associated with different carriers or service providers. Once a relationship has been established, routers can directly communicate data to each other based on geographical coordinates (e.g., degrees, hours, minutes, seconds), as described herein, rather than based on network topology. If a router cannot be found, however, the router may route based on network topology, which, in general, means that many more hops (e.g., sending data through more routers) may be required to get the data to its destination.

Tunneling protocols may be used to build a tunnel across a large network(s) to create a different logical topology for a network. Thus, instead of using a table containing logically available routers, an alternate table may contain routers that have an established relationship with the source router, as described above. The geographical area may be predefined when a relationship is established between two routers. In one embodiment, the source router and the destination router are located within the same geographical area, such as R1 and R2 in FIG. 3.

At step 540, if the list includes the destination router, which means that a router has been identified that is within the same geographical area as the destination mobile device, the data is then communicated to the destination router by way of the wireless communications network. Further, if the list includes the destination router, the destination router may determine whether the destination mobile device is locally connected to the destination router. If the destination mobile device is locally connected to the destination router, the destination router may then communicate the data to the destination mobile device. But, if the destination mobile device is not locally connected to the destination router, the destination router identifies another destination router that is located within the same geographical area as the destination mobile device and sends the data to the other destination router. This process may continue until a router determines that the destination mobile device is locally connected to it. If the list does not include the destination router, as shown at step 550, then the data is routed based on network topology using network information associated with the destination mobile device. The network information is included in the data sent from the source mobile device, as mentioned above.

In an alternate embodiment, it may be determined whether the host portion of the IP address associated with the destination mobile device is in a given range, such as in a certain geographical area. The host portion contains the geographical coordinates of the destination, and therefore, it may be determined whether the destination mobile device is located within the same geographical area as the source router. If the geographical coordinates of the destination mobile device indicate that the mobile device is in the same geographical area as the source router, then the source router accesses the table containing a list of routers and associated network addresses.

Figure 6:
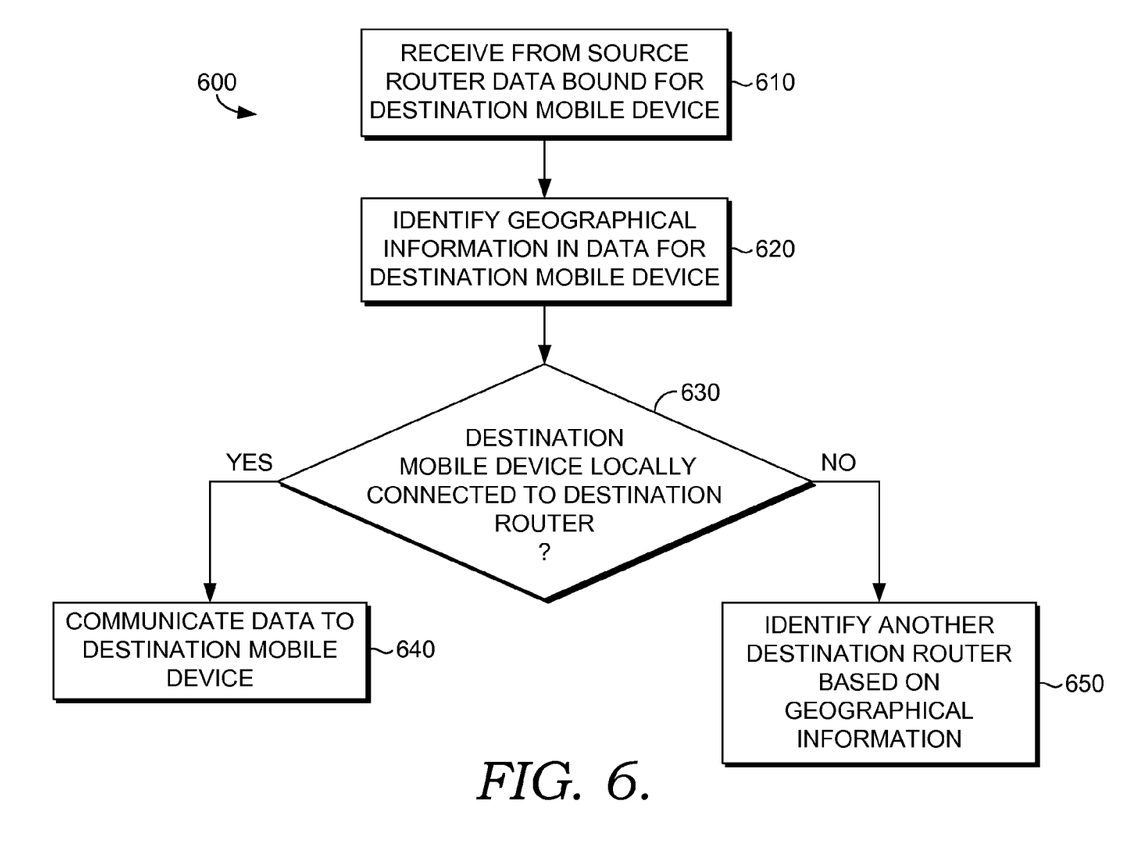

Turning now to FIG. 6, a method 600 for routing information through a wireless telecommunications network based on location information associated with a mobile device is shown. Initially at step 610, data is received from a source router that is bound for a destination mobile device. In one instance, the source router has previously determined, based on geographical information associated with the destination mobile device, that the destination router is within the same geographical area as the destination mobile device. This determination may have been made by the source router accessing a table containing routers and associated network addresses. The routers included in the list have an established relationship with the source router, which allows data to be directly communicated between routers. The destination mobile device is to receive the data from a source mobile device in order to establish a communications session between the two devices by way of a wireless telecommunications network. The data includes an IP address corresponding to the destination mobile device and has a network portion and a user portion. The user portion may include geographical information (e.g., geographical coordinates) associated with the destination mobile device. In one embodiment, the data is a packet that includes a header and a payload.

At step 620, geographical information is identified in the data for the destination mobile device. The user portion of the IP address may be analyzed to identify the geographical information associated with the destination mobile device. As mentioned, the geographical information may be determined by a GPS in the mobile device or by a RAN that uses triangulation technology to determine the location of the mobile device. Location may be a city, a zip code, a state, a county, geographical coordinates, etc. It is determined at step 630 whether the destination mobile device is locally connected to the destination router. At step 640, if the destination mobile device is locally connected to the destination router, the data is then communicated to the destination mobile device, thus establishing the communications session.

If, however, the destination mobile device is not locally connected to the destination router, another destination router is identified using the geographical information from a table associated with the destination router (e.g., first destination router) at step 650. The other destination router (e.g., a second destination router) may be located within the same geographical area as the destination mobile device. In one embodiment, if the destination router is not locally connected to the destination mobile device, the data may be routed using network topology, as opposed to being routed based on the geographical information of the destination mobile device. When geographical information is used, the data may be sent from one router to another by way of a tunneling protocol. While there are many tunneling protocols available, some exemplary tunneling protocols include L2TP and GRE, as described above.

Figure 7:
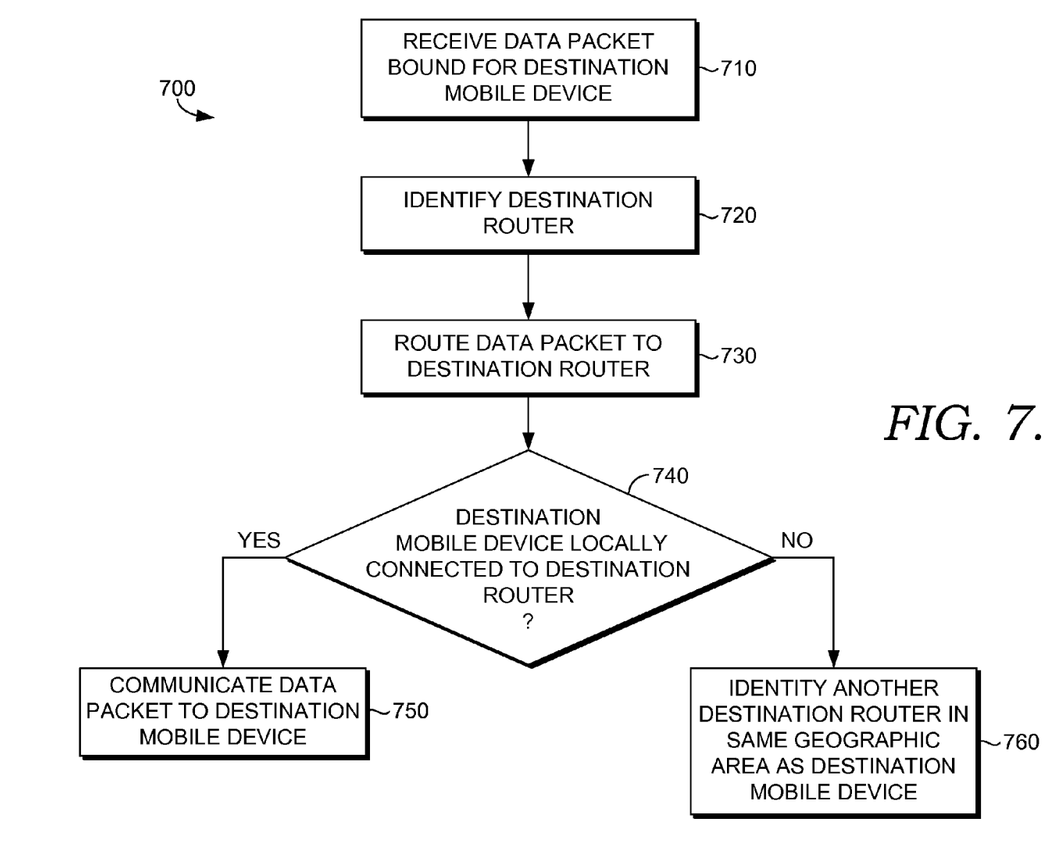

Referring to FIG. 7, a method 700 is illustrated for routing information through a wireless telecommunications network based on location information associated with a mobile device. Initially, at step 710, a data packet bound for a destination mobile device is received. In one embodiment, the data packet is received at a source router. The data packet is initiated at a source mobile device, and has a destination of a destination mobile device, as mentioned, in order to establish a communications session by way of a wireless telecommunications network. Based on geographical information associated with the destination mobile device included in the data packet, a destination router is identified at step 720, such that the data packet is sent to the destination router. The destination router may be identified by the source router accessing a table. The table includes routers and associated network numbers. In one embodiment, the routers listed in the table have an established relationship with the source router, wherein the relationship allows the source router to send data packets to the routers in the table (e.g., destination routers) by way of a tunneling protocol, as described herein. Using the geographical information associated with the destination mobile device, it may be determined that the destination router is located within the same geographical area as the destination mobile device.

At step 730, the data packet is routed directly to the destination router. It is determined at step 740 whether the destination mobile device is locally connected to the destination router. If the destination mobile device is locally connected to the destination router, the destination router, at step 750, communicates the data packet to the destination mobile device. But, if the destination mobile device is not locally connected to the destination router, the destination router identifies another destination router at step 760 that is located within the same geographical area as the destination mobile device. In one embodiment, it may be determined that another destination router that may be located within the same geographical area as the destination mobile device is not listed in the table. A routing table, which may be different than the table accessed above, may then be accessed to determine how to route the data packet based on network topology. The data may then be logically routed to the destination mobile device via a route determined by the routing table.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. Non-transitory computer-readable media having computer-executable instructions embodied thereon that, when executed, facilitate a method of routing information through a wireless telecommunications network based on location information associated with a mobile device, the method comprising:
   receiving from a source mobile device data that is to be communicated to a destination mobile device by way of a source router and a destination router;
   determining that the data includes geographical information associated with the destination mobile device;
   accessing a table comprising a list of one or more routers and their associated geographical coordinates, the one or more routers having an established relationship with the source router;
   using the table, determining whether the list includes the destination router that is located within a same geographical area as the destination mobile device;
   if the list includes the destination router, communicating the data directly to the destination router by way of a tunneling protocol; and
   if the list does not include the destination router, routing the data based on network topology using network information associated with the destination mobile device, wherein the network information is included in the data sent from the source mobile device.

2. The media of claim 1, wherein having an established relationship with the source router enables the source router to send the data directly to the destination router.

3. The media of claim 1, wherein the destination router is in the same network as the source router.

4. The media of claim 1, wherein the destination router is in a different network than the source router.

5. The media of claim 1, wherein the data is a packet that comprises a header and a payload.

6. The media of claim 5, wherein the header comprises a source IP address and a destination IP address, the destination IP address including the geographical coordinates associated with the destination mobile device.

7. The media of claim 1, wherein the geographical information is geographical coordinates.

8. The media of claim 2, wherein the same geographical area is a predefined area determined when the relationship was established between the source router and the destination router.

9. The media of claim 1, wherein if the list includes the destination router, the destination router determines whether the destination mobile device is locally connected to the destination router, such that,
   if the destination mobile device is locally connected to the destination router, the destination router communicates the data to the destination mobile device, and
   if the destination mobile device is not locally connected to the destination router, the destination router identifies another destination router that is located within the same geographical area as the destination mobile device and sends the data to the other destination router.

10. The media of claim 1, wherein the destination router is located within the same geographical area as the source router.

11. Non-transitory computer-readable media having computer-executable instructions embodied thereon that, when executed, facilitate a method of routing information through a wireless telecommunications network based on location information associated with a mobile device, the method comprising:
- receiving data from a source router via a tunneling protocol, wherein the source router has previously determined, based on geographical information associated with the destination mobile device, that the destination router is within a same geographical area as the destination mobile device,
- wherein the destination mobile device is to receive the data from a source mobile device to establish a communications session by way of the wireless telecommunications network, and
- wherein the data includes an Internet protocol (IP) address corresponding to the destination mobile device, the IP address comprising a network portion and a user portion that includes the geographical information associated with the destination mobile device;
- analyzing the user portion of the IP address to identify the geographical information associated with the destination mobile device;
- determining whether the destination mobile device is locally connected to the destination router;
- if the destination mobile device is locally connected to the destination router, communicating the data to the destination mobile device, thus establishing the communications session; and
- if the destination mobile device is not locally connected to the destination router, identifying from a table associated with the destination router another destination router that is located within the same geographical area as the destination mobile device.

12. The media of claim 11, wherein the tunneling protocol includes one or more of a Layer 2 Tunneling Protocol (L2TP) or a Generic Routing Encapsulation (GRE).

13. The media of claim 11, wherein the data is a packet comprising a header and a payload, the header comprising the IP address corresponding to the destination mobile device.

14. The media of claim 11, wherein each router has an associated table that lists various routers with which the router has established a relationship such that the relationship allows the routers to directly communicate the data.

15. The media of claim 11, wherein the source router and the destination router are in different wireless telecommunications networks.

16. The media of claim 11, wherein if the destination mobile device is not locally connected to the destination router, further comprising routing the data by way of network topology.

17. Non-transitory computer-readable media having computer-executable instructions embodied thereon that, when executed, facilitate a method of routing information through a wireless telecommunications network based on location information associated with a mobile device, the method comprising:
- receiving at a source router a data packet that is initiated at a source mobile device and whose destination is a destination mobile device, wherein the data packet is used to establish a communications session between the source mobile device and the destination mobile device by way of a wireless telecommunications network;
- based on geographical information associated with the destination mobile device included in the data packet, identifying a destination router to which the data packet is sent, the identifying including,
- accessing a table at the source router that includes a plurality of routers and associated network numbers, and
- using the geographical information associated with the destination mobile device, determining that the destination router is located within a same geographical area as the destination mobile device; and
- routing the data packet directly to the destination router via a tunneling protocol, wherein,
- if the destination mobile device is locally connected to the destination router, the destination router communicates the data packet to the destination mobile device, and
- if the destination mobile device is not locally connected to the destination router, the destination router identifies another destination router that is located within the same geographical area as the destination mobile device.

18. The media of claim 17, further comprising:
- determining that another destination router that is located within the same geographical area as the destination mobile device is not listed in the table; and
- accessing at the destination router a routing table to determine how to route the data packet based on network topology.

19. The media of claim 18, further comprising logically routing the data to the destination mobile device via a route determined by the routing table.

* * * * *